United States Patent [19]

van Lith

[11] Patent Number: 5,019,020

[45] Date of Patent: May 28, 1991

[54] TRANSVERSE ELEMENT FOR A DRIVING BELT

[75] Inventor: Johannes H. van Lith, Berlicum, Netherlands

[73] Assignee: Van Doorne's Transmissie B.V., Tilburg, Netherlands

[21] Appl. No.: 461,213

[22] Filed: Jan. 5, 1990

[30] Foreign Application Priority Data

Jan. 12, 1989 [NL] Netherlands ............ 8900072

[51] Int. Cl.$^5$ .............................................. F16G 1/22
[52] U.S. Cl. ...................................... 474/240; 474/242
[58] Field of Search ................ 474/201, 238, 240, 242, 474/244, 245, 272

[56] References Cited

U.S. PATENT DOCUMENTS

| 4,303,403 | 12/1981 | Lamers | 474/201 |
| 4,427,401 | 1/1984 | Hendriks et al. | 474/242 X |
| 4,595,385 | 6/1986 | Henderson | 474/201 |
| 4,655,732 | 4/1987 | Takashima | 474/201 |
| 4,826,473 | 5/1989 | Miyawaki | 474/240 |
| 4,838,845 | 6/1989 | Hattori et al. | 474/242 |
| 4,894,048 | 1/1990 | Inukai et al. | 474/240 |
| 4,915,677 | 4/1990 | Simon | 474/242 |

FOREIGN PATENT DOCUMENTS 0278545 8/1988 European Pat. Off. .

Primary Examiner—Thuy M. Bui
Attorney, Agent, or Firm—Pennie & Edmonds

[57] ABSTRACT

In a transverse element 5" for a driving belt the position of the center of gravity 22 is located near its tilting zone 7. This may be achieved by providing the radical bottom part of the conical part 6 with a profiling 16, such as a hollow 23. Preferably the form of the profiling 16 follows the convex abutting faces 11 for the carriers 10.

12 Claims, 1 Drawing Sheet

TRANSVERSE ELEMENT FOR A DRIVING BELT

BACKGROUND OF THE INVENTION

The invention relates to a transverse element for a driving belt, whereby a number of said transverse elements can be movably provided, one behind the other, in longitudinal direction on one or more endless carriers, whereby the transverse elements butt against one another with their principal faces, said transverse element being provided with at least two side faces converging relative to each other for co-operation with V-shaped pulleys and being bevelled radially inwardly in order to make bending of the driving belt possible, whereby the bevel and one main side blend together in a tilting zone.

Such a transverse element for a driving belt is for example known from the European patent No. 14013. The driving belt is also called thrust belt, because a torque is transmitted from the driving pulley to the driven pulley by means of the transverse transverse elements which thrust each other along in the thrust part of the driving belt, whereby the endless carrier or carriers acts as guide means. The transverse elements are led back from the driven pulley, along the return part of the driving belt, to the driving pulley. As has become apparent some play may thereby develop between the transverse elements in the return part. Said play may e.g. be caused by running-in wear of the driving belt which occurs in practice. The play found between the transverse elements accumulates in the return part and has appeared to be a drawback, since as a result the transverse elements are accommodated in the driving pulley with some mutual play, too. This inevitably leads to slip and, as a result, to loss of efficiency and wear.

SUMMARY OF THE INVENTION

The object of the invention is to overcome the above drawbacks and for that purpose provides a driving belt which is characterized in that the centre of gravity of the transverse element is located near the tilting zone or radially outwardly relative to the tilting line. As a result of this measure the transverse element, when leaving the driven pulley, keeps such an impulse that as a result of said impulse force the transverse elements join one another without any play in the return part and are accomodated in the driving pulley without any mutual play. As a result the efficiency of the transmission is increased whilst wear is reduced.

BRIEF DESCRIPTION OF THE DRAWINGS

The invention will be further explained hereinafter with reference to a drawing as well as to a few embodiments. In the drawing:

FIG. 3b shows a longitudinal view of the alternative embodiment of the transverse element according to FIG. 3a;

DESCRIPTION OF THE PREFERRED EMBODIMENTS

Figure 1:
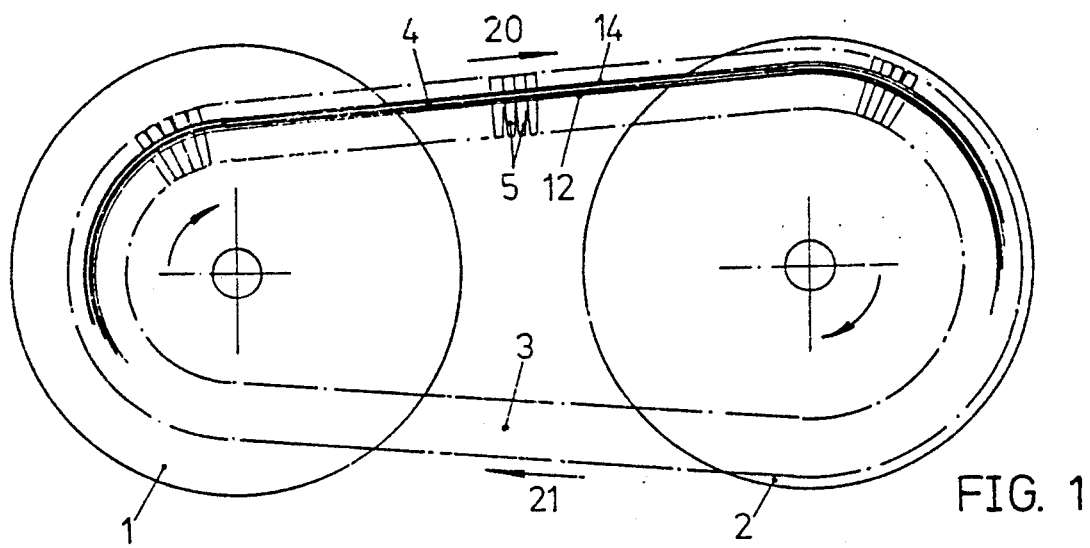
FIG. 1 shows a driving belt and a pulley assembly.

FIG. 1 illustrates two pulleys 1, 2 and, by means of a chain-dotted line, a driving belt 3, which is provided around the two pulleys 1, 2. The driving belt 3 is provided with a carrier 4, said carrier consisting of a number of endless strip-shaped bands. On the carrier 4 there are movably provided a plurality of transverse elements 5, which can come into contact with the pulleys 1, 2.

Figure 2A:
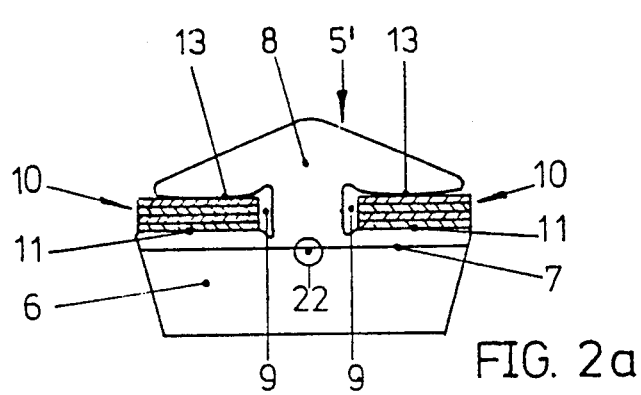
FIGS. 2a and 2b show a cross view and a longitudinal view, respectively, of a transverse element according to the invention.
Figure 2B:
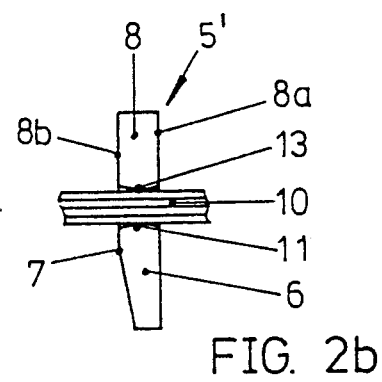

The transverse element 5' of FIG. 2 is provided with a generally trapezoidal part 6, which at the location of a tilting line or tilting zone 7 blends into a part 8 with parallel principal faces 8a, 8b. The transverse element is provided with two recesses 9, in which two carriers 10 are provided, each carrier consisting of four strip-shaped endless bands in the illustrated embodiment. The recesses 9 are bounded by an abutting face 11 for butting against the inner side 12 of the carrier 10, and an abutting face 13 for co-operation with the outer side 14 of the carrier 10. Both the abutting face 13 and the abutting face 14 are slightly rounded in transverse and longitudinal direction.

In FIG. 1 pulley 1 is the driving pulley and pulley 2 is the driven pulley. The pulley 1 thrusts the transverse elements 5 towards the pulley 2, in the direction of the arrow 20, in the so-called thrust part of the driving belt, whereby a next transverse element forcefully thrusts a preceding transverse element along. A transverse element entering the driven pulley can thus transmit a friction force to said pulley 2. The transverse elements are guided by the carriers 10 and make a relative movement with respect to the carrier 10.

The transverse elements 5 leave the pulley 2 in the direction of the arrow 21, along the so-called return part and are led towards the pulley 1. Any play present between the transverse elements, which may e.g. have developed as a result of running-in wear, accumulates in said return part. As a result the transverse elements are also accommodated in the pulley 1 with some play. This leads to slip, resulting in the loss of efficiency and increased wear.

Figure 3A:
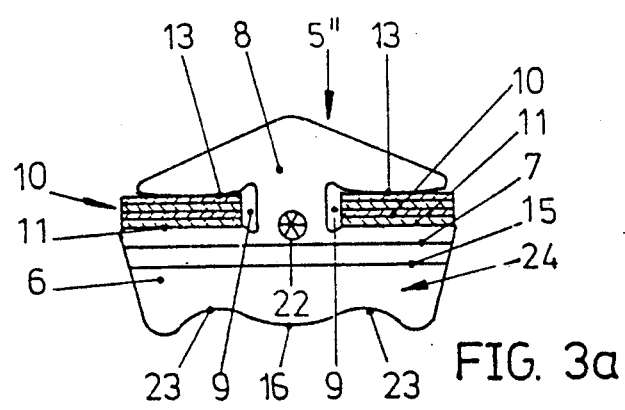
FIG. 3a shows a cross view of an alternative embodiment of the transverse element according to the invention.
Figure 3B:
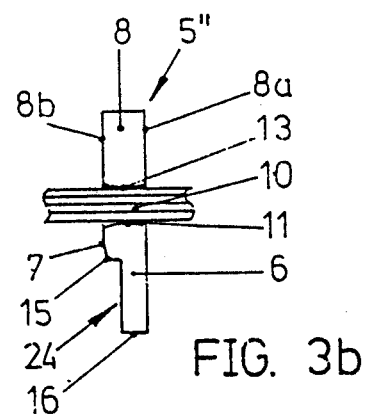

According to the invention the adverse effects of said play can be overcome by using transverse elements having their centre of gravity 22 near the tilting zone 7, (transverse element 5', FIGS. 2a, 2b), or above the tilting zone 7 (transverse element 5'', FIGS. 3a, 3b). A preferred range for the location of the center of gravity is from 0.5 mm under tilting zone to 3 mm above the tilting zone. As a result of this measure the transverse elements leave the pulley 2 with sufficient energy content for bridging said play and generating an abutting series of transverse elements before the pulley 1, which are received in the pulley 1 with sufficient force and without any play. As a result of this a free length, on which no transverse element is present, is formed on the carrier 10, directly at the run-out of the pulley 2. Because the transverse elements have a larger energy content the transverse elements move through said free length and sufficient energy is left for the transverse elements to join a series of transverse elements which are present before the pulley 1, and to exert some thrust against said series. At the same time said thrust force exerts a positive torque on the pulley 1.

The desired positioning of the centre of gravity 22 may be achieved in various ways. A problem is thereby that the trapezoidal part 6, which is largely located below the tilting line, is heavily loaded in the pulleys and must therefore be made sufficiently strong and rigid, in order to oppose e.g. buckling. This requirement is incompatible with raising the position of the centre of gravity, however. An unlimited increase in the mass of the upper part 8 is thereby not desirable either, since the result would be a considerable increase in the total weight of the upper part 8, whilst the efficiency would decrease.

According to the invention a raised position of the centre of gravity, in combination with sufficient (buckling) strength/rigidity can i.a. be achieved by profiling (16) the radial bottom part of the trapezoidal part 6. Preferably the profile 16 follows the pattern of the radial upper side of the part 6, such that a smooth transmission of tension is ensured. Thus the radial upper side is provided with slightly convex abutting faces 11 for the carriers 10, as a result of which a hollow 23 can be provided at the radial bottom side of the part 6. All this is illustrated in FIGS. 3a and 3b for the transverse element 5", and results in a higher position of the centre of gravity in relation to that of the transverse element of FIG. 2.

Figure 4:
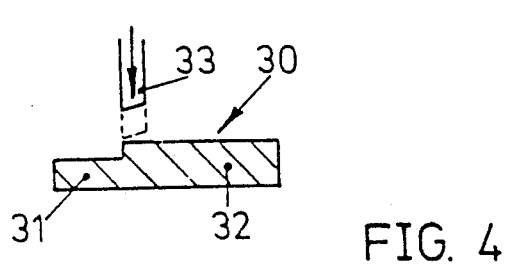
FIG. 4 shows a diagrammatically indicated method for the partial manufacture of the transverse element according to FIG. 3.
Figure 4:
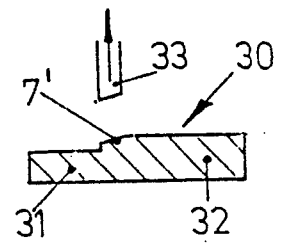

A raised position of the centre of gravity is furthermore effected for the transverse element 5" (FIGS. 3a, 3b) in that part of the trapezoidal part 6, under the tilting zone 7, is narrowed, viz. along the boundary 15/24. This also results in a raised position of the centre of gravity 22. Otherwise it is not necessary to remove material along the boundary 15/24 afterwards, i.e. after the production of the transverse element 5", in order to effect the desired narrowing and with it a raised position of the centre of gravity in this manner. In the production of the transverse element 5" the intended narrowing of the trapezoidal part 6 under the tilting zone 7 can be taken into account in advance. Thus the transverse element 5" may e.g. be made of profiled strip material 30, in which there is already provided a thinned down part 31 (FIG. 4), which joins a thicker part 32 which practically corresponds with the thickness of the transverse element 5". The transverse element 5" may be die-cut from the profiled strip material 30, in a manner which is otherwise known. The tilting zone 7' can thereby be pressed in the material in a simple manner (FIG. 4), by means of e.g. the die 33, as a separate step or e.g. as part of a die-cutting operation. Because of this method a raised position of the centre of gravity is obtained without any additional operations and costs being necessary.

It will be apparent that the invention is not restricted to the illustrated embodiments, but that many alternatives are conceivable within the framework of the invention, which alternatives are all considered to fall within the scope of the invention.

I claim:

1. Transverse element for a driving belt, wherein a number of said transverse elements are movably provided, one behind the other, in longitudinal direction on at least one endless carrier, whereby the transverse elements butt against one another with their principal faces, said transverse element being provided with at least two sides faces converging relative to each other for co-operation with V-shaped pulleys and being bevelled radially inwardly in order to make bending of the driving belt possible, wherein the bevelled portion and one principal face joint at a tilting zone, and the center of gravity of the transverse element is located in a region beginning near the tilting zone and extending radially outwardly therefrom.

2. Transverse element according to claim 1, wherein the center of gravity is located within a range from 0.5 mm under the tilting zone to 3 mm above the tilting zone.

3. Transverse element according to claim 1 or 2, wherein said transverse element has a profiled radial bottom side.

4. Transverse element according to claim 3, wherein the profile comprises at least one hollow.

5. Transverse element according to claim 1, wherein the transverse element is at least partly narrowed under the tilting zone.

6. Transverse element according to claim 5, wherein the bevelled portion is provided between the tilting zone and the narrowed part.

7. Transverse element according to claim 1 or 2 further comprising means interconnecting the transverse elements to form a driving belt.

8. A driving belt, comprising:
    an endless carrier for passing around driving and driven V-shaped pulleys; and
    a plurality of transverse elements slidably disposed on said endless carrier and abutting against adjacent elements on abutting generally parallel faces, said elements including
        converging sides extending in a direction inward from said endless carrier cooperating with the V-shape of said pulleys,
        a bevelled face extending in a direction inward from said endless carrier cooperating with a face of an adjacent element to provide means for passing around said pulleys, said bevelled face and one of said abutting faces intersecting at a tilting zone, and
        a center of gravity located approximately at said tilting zone.

9. Driving belt according to claim 8, wherein center of gravity of the transverse elements is located within a range of about 0.5 mm inward from the tilting zone to about 3 mm outward from the tilting zone.

10. Driving belt according to claim 8, wherein the transverse elements are narrowed in the longitudinal direction inward of the tilting zone, whereby a stepped section is created inward of the tilting zone.

11. Driving belt according to claim 10, wherein the bevelled face extends between the tilting zone and the narrowed portion of the transverse element.

12. A transverse element for a driving belt having longitudinal and transverse directions, wherein a plurality of elements are provided on at least one endless carrier, with said elements slidable along said endless carrier in the longitudinal direction and abutting against adjacent elements over at least portions of said driving belt, said elements comprising;
    a body shaped to slidably engage said endless carrier and having two spaced apart parallel faces perpendicular to the direction of sliding; and
    a first body portion extending from the point of engagement with said endless carrier, said first body portion having a bevelled face for cooperating with adjacent elements on a driving belt to provide means for bending around a pulley, said bevelled face intersecting with one of said parallel faces at a tilting zone; wherein the center of gravity of said element is located within an area extending 0.5 mm from the tilting zone in a direction away from said engagement point to 3 mm from the tilting zone in a direction towards said engagement point.

* * * * *